INVENTORS
WILLIAM E. ELWELL
NEAL W. FURBY

BY *J. R. Adams*
ATTORNEY

Patented June 10, 1947

2,422,002

UNITED STATES PATENT OFFICE 2,422,002

NEUTRAL, HIGHLY UNSATURATED POLYMERIC COMPOSITION AND METHOD FOR PRODUCING SAME

William E. Elwell, Berkeley, and Neal W. Furby, El Cerrito, Calif., assignors, by mesne assignments, to California Research Corporation, San Francisco, Calif., a corporation of Delaware Application March 20, 1944, Serial No. 527,290

14 Claims. (Cl. 196—149)

This invention relates to petroleum derivatives and processes therefor and particularly refers to a group of products derived from polymerized bottoms remaining from the sulfuric acid treatment and distillation of thermally reformed naphthas.

Heretofore, it has been proposed to utilize the bottoms remaining from the distillation of acid treated cracked naphthas to produce resins, paint and varnish oils and the like, as in United States Patents Nos. 1,945,719 to F. A. Apgar et al., and 2,293,208 to A. Lazar. These latter disclosures, however, comprehend primarily the utilization of cracked naphtha as a starting material, which material differs from thermally reformed naphtha in numerous respects, as will be pointed out in greater detail below. Furthermore, the products produced by those disclosures are quite different in their properties and behavior from those obtained by us, as will be apparent from the following descriptions and examples.

Primarily, thermally reformed naphtha differs from cracked naphtha in that it is derived by drastic heat treatment from low boiling distillation products, the distillate being only slightly reduced in molecular weight in the reforming process by being partially dehydrogenated and isomerized. This operation of thermal reforming is carried out under well known conditions which are not comparabe to those used in cracking. Cracked naphtha, on the other hand, is the direct result of heat treatment at considerably lower temperatures of heavy oils such as gas oil, fuel oil, tar, asphalt, etc., and is accompanied by the production of much gas and coke or tar, which latter by-products are substantially, if not completely, absent in thermal reforming. Furthermore, the resins derived by acid treatment, neutralization, and distillation of the two different naphthas, viz., cracked and thermally reformed, are quite different, the latter having a higher degree of unsaturation, a higher iodine number, a greater temperature-viscosity coefficient, and a higher degree of reactivity when subsequent polymerizations are carried out by simple heating with vegetable oils, such as linseed. Further proof that thermally reformed naphtha polymers are unique is the fact that comparable products have not been found in naphthas from other pyrolytic conversion such as catalytic cracking and catalytic reforming. Accordingly, the term "reforming" as used in the present specification and claims designates the drastic heat treatment of low boiling hydrocarbon distillates to partially dehydrogenate and isomerize the same with only slight reduction in molecular weight. This type of treatment is well known in the petroleum industry and is designated by this term. As may be readily understood, the term "reformed naphtha" likewise specifies the partially dehydrogenated and isomerized naphtha from said reforming operation. Similarly, "thermal reforming" and 'thermally reformed" naphtha refer to a process and product, respectively, in which the reforming is effected by the action of heat.

For example, to illustrate the difference in the characteristics of the polymers from thermally reformed reaction products, when a simple mixture of equal parts linseed oil and thermally reformed naphtha polymers produced according to this invention, said polymers having a viscosity of 300 S. S. U. seconds at 130° F., was spread out in a thin film, it dried dust free in 72 hours, while a similar proportion of linseed oil and polymers of similar viscosity but derived from cracked naphtha had not dried dust free after 170 hours under identical conditions. The same test was repeated with the addition to each mixture of 0.4% lead naphthenate and 0.04% manganese naphthenate as siccatives or driers, whereupon the mixture containing the thermally reformed naphtha polymers dried tack free in 14 hours and that containing the cracked naphtha polymers required 150 hours to dry tack free.

In the attached drawing, which forms a part of this specification,

Figure 1:
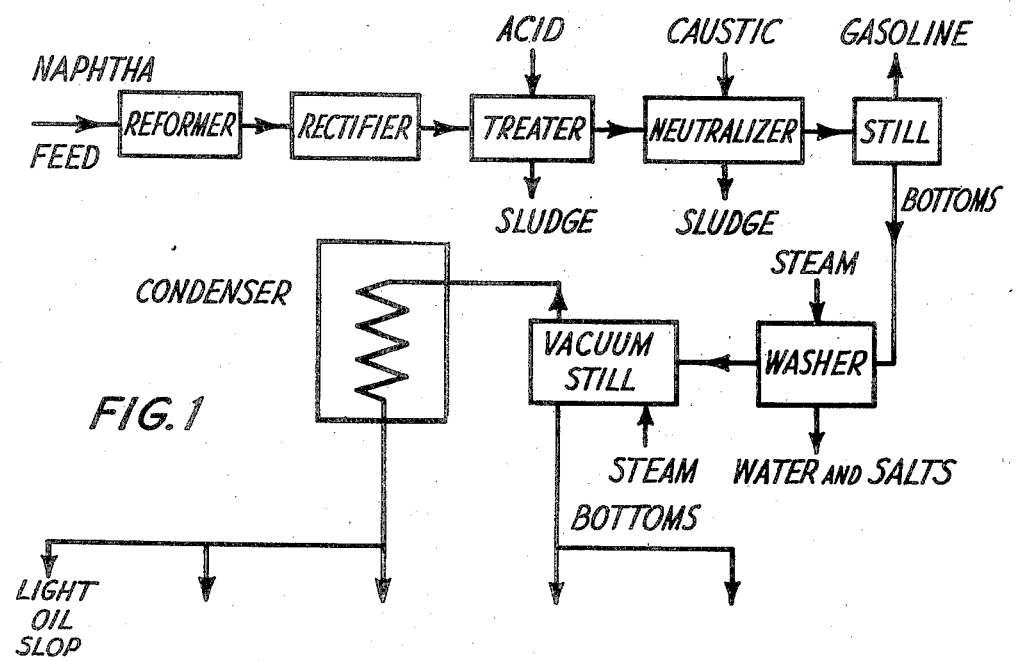
Figure 1 represents diagrammatically a preferred procedure for processing the reformed naphtha according to this invention.
Figure 2:
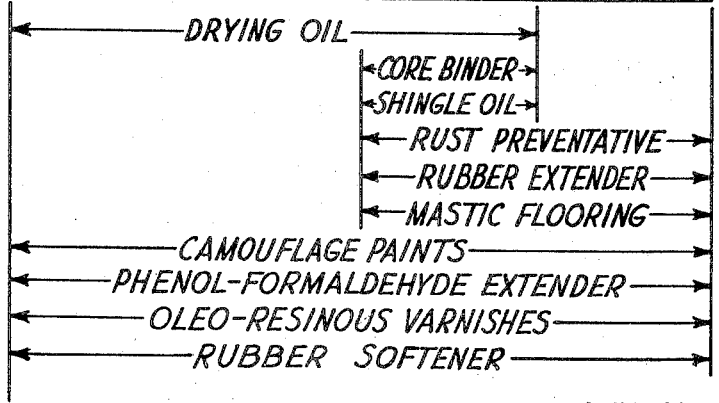
Figure 2 represents the general characteristics of the products, separated in various ways by distillation or otherwise, together wtih examples of the uses to which certain of these products have been found particularly applicable.

Starting with a thermally reformed naphtha stock having a molecular weight of about 70 to 200, an A. P. I. gravity greater than 45°, and an end point lower than 450° F., the stock is first contacted with sulfuric acid or a mixture of sulfuric acid and sludge, preferably according to the R. A. Halloran Patent No. 1,684,489, and desirably at a temperature of 20–50° F. The sludge is drawn off and the treated reformed naphtha is neutralized to a pH of 7 or over, which pH desirably is maintained during the succeeding operations. If it is particularly desired that the final product be light in color, the preferred starting material is a thermally reformed naphtha having a gravity of over about 48° A. P. I., and an end point lower than about 410° F.

The neutralized treated reformed naphtha is then distilled at about atmospheric pressure in the presence of steam to remove gasoline fractions, leaving residuum or bottoms which are preferably treated with open steam at about atmospheric pressure to remove color bodies and various salts such as sodium salts that are water soluble, the bottoms subsequently being permitted to stand until bright. A slight cloud is not objectionable, so long as it is due only to water. These bottoms are then reduced under a vacuum of about 25–28 inches Hg, and in the presence of steam, desirably in an ordinary shell still and at fairly low temperature (300°–450° F.), the overhead fractions being simply condensed without fractionation, to obtain liquid or viscous products as desired, the residuum being withdrawn to obtain resinous products of different melting point characteristics, examples of which will be more fully described below.

In general, the products of the process just described may be characterized as neutral, highly unsaturated polymeric materials with an empirical formula of $(C_3H_4)_n$ and a molecular weight range of about 200–1000. They may range in viscosity from liquids of 90–10,000 S. S. U. at 100° F. to gummy or even hard solids having melting points upward of 200° F. Preferably, the liquid polymer fraction distilled overhead has a viscosity ranging from 100 S. S. U. to 10,000 S. S. U. at 100° F. The polymer bottoms from the distillation may have consistencies ranging from 1,000 S. S. U. at 100° F. to 250° F. melting point. When preparing a drying oil, the liquid polymer bottoms preferably have a viscosity in the range of from 90 S. S. U. at 100° F. to 300 S. S. U. at 210° F., and when an elastomer compounding material is being prepared, consistencies ranging from 100 S. S. U. at 100° F. to 150° F. melting point are presently recommended. A final residuum having a melting point of 100° F. to 200° F. may be produced as a solid resin having general ability, as is illustrated by the formulation with 150° F. melting point resin of specific Example 2 hereinafter described. Specific gravities may range from about 0.96 to 1.05, and iodine numbers may vary from 160–225. The products exhibit excellent drying properties and also co-polymerize with other reactive materials such as linseed oil. They are usually reddish brown by transmitted light and fluorescent green by reflected light. They are soluble in all proportions in natural drying oils, carbon tetrachloride, benzene, petroleum thinners, lacquer solvents, butyl alcohol, and acetone. They exhibit partial solubility in ethyl and methyl alcohol. Sulfur dissolves in the products at low temperatures and is highly reactive with them at temperatures above 300° F. The sulfur reaction product so formed is insoluble in most solvents. The products are from about 50% to 80% soluble in sulfuric acid (determined as unsulfonatable residue).

Applications of these products are quite numerous, but have been found to include extenders for linseed and other vegetable drying oils, with which latter they co-polymerize readily, modifiers for varnishes and lacquers, printing inks, core oils, shingle oils and stains, concrete curing oil, lining, mastic floor-tile, insulation, linoleum, friction tape, oil cloth and the like. Certain of the more viscous products which may include both the distillate and bottoms or residua of the final operation described above have been found useful as extenders, softeners and plasticizers for natural and synthetic rubbers or elastomers, both virgin and reclaimed. These products also co-polymerize with phenol-formaldehyde or cresylic acid-formaldehyde and are useful for molding compounds, plywood adhesives and synthetic oleo-resinous varnishes. The solid products are thermoplastic, but otherwise exhibit about the same characteristics as the liquid products. They may be cut back with paint thinners and lacquer solvents and as such are excellent rust preventatives. Following are a number of typical formulations of certain of the foregoing uses for these products.

EXAMPLE 1.—PAINT WITH REFORMED NAPHTHA POLYMER BINDER

The following paint was prepared containing reformed naphtha polymer and exposed in comparison to one identically formulated employing linseed oil only as binder.

Table I

|  | Parts by Volume in Paint | | |
| --- | --- | --- | --- |
|  | Primer | Second | Finish |
| Pigment composition (parts by weight):<br>  Basic Carbonate Whitehead _____ 50<br>  Zinc Oxide (American Process) _____ 20<br>  Titanium Barium Pigment (30% $TiO^2$) _____ 20<br>  Asbestine _____ 10<br>                                   100 | 23.5 | 37.5 | 26.5 |
| Binder:<br>  Raw Linseed Oil | 76.5 | 62.5 | 73.5 |
|   Reformed Naphtha Drying Oil (200 S. S. U. at 130° F.) | 10.0 | 10.0 | 10.0 |
| Drier (0.3% Pb, 0.03% Mn, 0.03% Co based on binder):<br>  Pb naphthenate (18% Pb) | 1.45 | 1.21 | 1.39 |
|   Mn naphthenate (6% Mn) | .43 | .36 | .42 |
|   Co naphthenate (6% Co) | .43 | .36 | .42 |
| Thinner | 93.3 | 87.6 | 34.5 |

After several months' exposure this paint shows slight checking that is progressively disappearing; less dirt collection than the linseed panel; and considerably less chalking.

EXAMPLE 2.—GASOLINE RESISTANT AIRPORT SURFACING

To prevent gasoline spills from destroying asphaltic airport paving, a low-cost oil-resistant surfacing for the pavement is desired. The following product was developed to meet this requirement:

| Formulation | Parts by Volume |
| --- | --- |
| Reformed Naphtha Polymer Residuum (150 M. P.) | 28 |
| Linseed Oil (heavy bodied or blown) | 20 |
| Hydrocarbon Thinner | 50 |
| Lead Naphthenate (18% Pb) | 1.6 |
| Manganese Naphthenate (6% Mn) | 0.4 |

This product dries dust free within thirty minutes through solvent evaporation; tact free within 4–6 hours; and print free within 24 hours. The dried film after 24 hours is only partially resistant to gasoline with full resistance developing within 48–72 hours. These figures are for average conditions and much faster drying is obtained if the paving is warm or the sun shining.

EXAMPLE 3.—COMPOUNDING FOR "BUNA S" SYNTHETIC RUBBER

Owing to the reactivity of the reformed naphtha polymer with sulfur, it was found necessary to include additional sulfur to meet this requirement in the compounding. This is shown in Table II using 1,3-butadiene-styrene co-polymer rubber (Buna S).

Table II

| Formulation | A | B | C | D | E |
|---|---|---|---|---|---|
| Per cent Sulfur for Buna S | 2 | 2 | 2 | 2 | 2 |
| Per cent Sulfur for ref. naphtha polymer | 2 | 3 | 4 | 5 | 6 |
| Total Sulfur | 4 | 5 | 6 | 7 | 8 |
| Buna S | 100 | 100 | 100 | 100 | 100 |
| Reformed naphtha polymer (100 S. S. U. at 210° F.) | 40 | 40 | 40 | 40 | 40 |
| Stearic Acid | 0.5 | 0.5 | 0.5 | 0.5 | 0.5 |
| Zinc Oxide | 5 | 5 | 5 | 5 | 5 |
| 2-Mercapto Benzothiazole | 1.5 | 1.5 | 1.5 | 1.5 | 1.5 |
| Diphenylguanidine | 0.25 | 0.25 | 0.25 | 0.25 | 0.25 |
| Channel Black | 50 | 50 | 50 | 50 | 50 |
| Tensile at optimum cure | 2,000 | 2,100 | 2,300 | 2,100 | 2,210 |
| Elongation at optimum cure | 615 | 650 | 600 | 575 | 525 |
| Modulus (300%) at optimum cure | 815 | 835 | 840 | 850 | 1,010 |
| Hardness (shore) at optimum cure | 63 | 62 | 65 | 65 | 66 |
| Time for optimum cure, min. | 45+ | 40 | 35 | 35 | 35 |

EXAMPLE 4.—EXTENDER FOR "BUNA S" SYNTHETIC RUBBER

It has been found that extraordinarily high loadings of carbon black can be employed with 1,3-butadiene styrene co-polymer (Buna S) by compensating for the accompanying hardening effect by the addition of substantial proportions of reformed naphtha polymer. This is shown in Table III. It will be noted that additional sulfur is included in the formulation to provide for the requirement of the reformed naphtha polymer.

The data shown in this and the preceding example demonstrate the effectiveness of this material in extending the rubber component of the compositions. In Example 3 the proportion of rubber required is reduced by the 40 parts of polymer. In this example the proportion of rubber is reduced by the 50 parts of reformed naphtha polymer and the 25–125 additional parts of carbon black.

Table III

| | A | B | C | D | E | F | G |
|---|---|---|---|---|---|---|---|
| Buna S | 100 | 100 | 100 | 100 | 100 | 100 | 100 |
| Reformed Naphtha Polymers (100 S. S. U. at 210° F.) | 50 | 50 | 50 | 50 | 50 | 50 | 50 |
| Stearic Acid | 1 | 1 | 1 | 1 | 1 | 1 | 1 |
| Zinc Oxide | 5 | 5 | 5 | 5 | 5 | 5 | 5 |
| Sulfur | 3.5 | 3.5 | 3.5 | 3.5 | 3.5 | 3.5 | 3.5 |
| 2-2' Benzothiazyl Disulfide | 1.75 | 1.75 | 1.75 | 1.75 | 1.75 | 1.75 | 1.75 |
| Diphenyl Guanidine | 0.25 | 0.25 | 0.25 | 0.25 | 0.25 | 0.25 | 0.25 |
| Hard Processing Channel Black | 50 | 62.5 | 75 | 87.5 | 100 | 112.5 | 125 |
| Medium Thermal Black | 25 | 31.5 | 37.5 | 43.75 | 50 | 56.25 | 62.5 |
| Tensile | 1,780 | 1,900 | 1,735 | 1,705 | 1,650 | 1,625 | 1,520 |
| Elongation at Break | 650 | 640 | 540 | 500 | 425 | 325 | 275 |
| Modulus at 300% | 580 | 785 | 990 | 1,200 | 1,399 | 1,550 | |
| Hardness (shore) | 56 | 65 | 69 | 73 | 80 | 83 | 86 |

Cure 60 minutes—292° F.

EXAMPLE 5.—SOFTENER FOR "PERBUNAN" SYNTHETIC RUBBER

Reformed naphtha polymer was employed as a softener for 1,3-butadiene-acrylonitrile copolymer (Perbunan). The following compound was employed: Perbunan—100 parts; stearic acid—0.5 part; zinc oxide—5 parts; 50/50 thermal and channel blacks—55 parts; anti-oxidant—1 part; 2-2'benzothiazyl disulfide—1 part; diphenyl guanidine—0.25 part; sulfur—2.5 parts; and reformed naphtha polymer (200 S. S. U. at 100° F.)—20 parts. Cured at 287° F. for 20 minutes (optimum cure) the product gave a tensile strength of 3225 p. s. i. elongation of 500% and Shore hardness of 55.

EXAMPLE 6.—SOFTENER FOR "NEOPRENE GN" SYNTHETIC RUBBER

Chloroprene polymer (Neoprene GN) was compounded as follows: 100 parts of rubber; 0.1 part accelerator activator; 0.5 part stearic acid; 20 parts anti-oxidant; 4 parts calcined magnesia (ext. lt.); 85 parts thermal black; 20 parts of reformed naphtha polymer (100 S. S. U. at 210° F.). Sulfur (0.70 part) was added to satisfy the reaction requirements of the reformed naphtha polymer. Comparative compounds were made (1) in which no softener was added, and (2) in which 20 parts of process oil was added. The sulfur was omitted in these cases. The tensile products for the blank, the compound containing process oil, and the compound containing reformed naphtha polymer were $5.5 \times 10^5$, $7.5 \times 10^5$, and $7.5 \times 10^5$, respectively. The reformed naphtha polymer gave a much cooler running stock and was incorporated in approximately one-half the time required for the process oil.

EXAMPLE 7.—SOFTENER FOR RECLAIMED NATURAL RUBBER

Red inner tube reclaim was compounded as follows: 100 parts of reclaim, 1 part stearic acid, 2 parts zinc oxide, 35 parts channel black, 1 part 2-2'benzothiazyl disulfide; 2 parts sulfur, and 10 parts of reformed naphtha polymer (100 S. S. U. at 210° F.). Cured 20 minutes at 287° F. (optimum cure) the product gave the following tests; tensile strength—1730 p. s. i.; elongation at break—525%; shore hardness—65; and tensile product of $9.1 \times 10^5$. A compound prepared according to the same descriptions, substituting mineral rubber for the reformed naphtha polymer, gave the following tests: tensile strength—1675 p. s. i., elongation at break—475%; shore hardness—65; and tensile product of $7.9 \times 10^5$.

It will be appreciated that the scope of this invention is not limited to any particular polymer or group of polymers having specific viscosity or melting point characteristics, but is broadly directed to polymers from reformed naphthas, which are distinct in character and properties from those of the prior art, such as those derived directly from cracked naphtha. Accordingly, all such methods and product that come within the scope of the appended claims are embraced thereby.

We claim:

1. The method of making neutral, highly unsaturated polymers of the character described comprising treating a thermally reformed naphtha with sulfuric acid to polymerize the unsaturated compounds thereof, separating the resulting acid sludge, neutralizing the remaining oil layer from which the acid sludge has been separated, distilling off from said remainder those components boiling in the gasoline range and then reducing the residuum under a vacuum of about 25 inches Hg and steam at temperatures not over about 450° F. to produce polymers having iodine numbers of from about 160 to 225.

2. The method of claim 1 with the added step of purifying the residuum from the gasoline distillation step with steam and separating moisture and salts therefrom before said reducing operation.

3. The method of claim 1 in which said final reduction is carried out in a batch still without fractionation, producing liquid polymers overhead and 100-200° F. melting point polymers as a final residuum.

4. The method of claim 1 in which said thermally reformed naphtha is derived from a feed stock having a molecular weight of about 70-200, and A. P. I. gravity greater than 45° and an end point lower than about 450° F.

5. A neutral, highly unsaturated polymeric composition consisting essentially of a sulfuric acid polymerization product formed by sulfuric acid treatment of a thermally reformed petroleum naphtha containing unsaturated compounds from thermal reforming, said polymeric composition being preferentially soluble in said thermally reformed petroleum naphtha in the presence of sulfuric acid and having an iodine number from about 175 to about 195, a specific gravity from 0.96 to 1.05, and a viscosity of at least about 90 S. S. U. at 100° F.

6. A neutral, highly unsaturated polymeric composition consisting essentially of a sulfuric acid polymerization product formed by sulfuric acid treatment of a thermally reformed petroleum naphtha having an A. P. I. gravity greater than about 45°, an end point lower than 450° F., and containing unsaturated compounds from thermal reforming, said polymeric composition being preferentially soluble in said thermally reformed petroleum naphtha in the presence of sulfuric acid and having an iodine number from about 175 to about 195, a specific gravity from 0.96 to 1.05, and a viscosity of at least about 90 S. S. U. at 100° F.

7. A drying oil comprising a highly unsaturated polymeric composition consisting essentially of a sulfuric acid polymerization product formed by sulfuric acid treatment of a thermally reformed petroleum naphtha containing unsaturated compounds from thermal reforming, said polymeric composition being preferentially soluble in said thermally reformed petroleum naphtha in the presence of sulfuric acid and having an iodine number from about 175 to about 195, a specific gravity from 0.96 to 1.05, and a viscosity from about 90 S. S. U. at 100° F. to 300 S. S. U. at 210° F.

8. A hydrocarbon drying oil extender comprising a polymerization product formed by sulfuric acid treatment of a thermally reformed petroleum naphtha containing unsaturated compounds from thermal reforming, said hydrocarbon drying oil extender being preferentially soluble in said thermally reformed petroleum naphtha in the presence of sulfuric acid and having a consistency in the range of from 90 S. S. U. at 100° F. to 300 S. S. U. at 210° F., an iodine number of from 175 to 195, a specific gravity of from 0.96 to 1.05, being soluble in natural drying oils, carbon tetrachloride, benzene, butyl alcohol, acetone and 50 to 80% soluble in sulfuric acid, said hydrocarbon drying oil extender being copolymerizable with linseed oil.

9. The method of claim 1, in which said final reduction is carried out without fractionation, producing overhead liquid polymers ranging from 100 to 10,000 S. S. U. at 100° F., and leaving as final residua thermoplastic polymers having a viscosity above about 1,000 S. S. U. at 100° F. and a melting point below about 250° F.

10. An elastomer compounding material comprising a highly unsaturated polymeric composition consisting essentially of a sulfuric acid polymerization product formed by sulfuric acid treatment of a thermally reformed petroleum naphtha containing unsaturated compounds from thermal reforming, said polymeric composition being preferentially soluble in said thermally reformed petroleum naphtha in the presence of sulfuric acid and having an iodine number from about 175 to about 195, a specific gravity from 0.96 to 1.05, a viscosity of at least about 100 S. S. U. at 100° F. and a maximum melting point of about 150° F.

11. A process of producing a neutral unsaturated polymer having an iodine number of from about 160 to 225 from a thermally reformed petroleum naphtha containing unsaturated reaction products of a thermal reforming operation which comprises polymerizing said unsaturated compounds by treatment of said reformed naphtha with sulfuric acid to form unsaturated polymers preferentially soluble in said thermally reformed petroleum naphtha in the presence of said sulfuric acid, separating acid sludge from the treated naphtha, neutralizing the remaining naphtha, and recovering a mixture of said unsaturated preferentially-naphtha-soluble polymers by distillation of said neutralized naphtha to yield a mixture of polymers having an iodine number of from about 160 to 225, a viscosity of at least 90 S. S. U. at 100 and a maximum melting point of about 250° F.

12. A process of producing a neutral, highly unsaturated polymer from a thermally reformed petroleum naphtha containing unsaturated reaction products of a thermal reforming operation, which comprises polymerizing said unsaturated compounds by treatment of said reformed naphtha with sulfuric acid, separating acid sludge from the treated naphtha, neutralizing the remaining naphtha and distilling off from the naphtha those components boiling in the gasoline range and separating the remaining polymer mixture by steam distillation under vacuum at a temperature not over about 450° F. into at least one overhead fraction having a relatively low viscosity and at least one bottoms fraction having a viscosity of at least 90 S. S. U. at 100° F. and a maximum melting point of 250° F.

13. A hydrocarbon polymer comprising a polymerization product formed by sulfuric acid treatment of a thermally reformed petroleum naphtha containing unsaturated compounds from thermal reforming, said polymer being preferentially soluble in said thermally reformed petroleum naphtha in the presence of sulfuric acid and having a viscosity of at least 90 S. S. U. at 100° F., a maximum melting point of 250° F., an iodine number of from 175 to 195, a specific gravity of from 0.96 to 1.05, being soluble in natural drying oils, carbon tetrachloride, benzene, butyl alcohol, acetone and 50 to 80% soluble in sulfuric acid, said polymer being copolymerizable with linseed oil and highly reactive with dissolved sulfur at 300° F.

14. An elastomer compounding material comprising a polymerization product formed by sulfuric acid treatment of a reformed petroleum naphtha containing unsaturated compounds from thermal reforming, said elastomer compounding material being preferentially soluble in said thermally reformed petroleum naphtha in the presence of sulfuric acid and having a viscosity of at least about 100 S. S. U. at 100° F., a maximum melting point of about 150° F., an iodine number of from 175 to 195, a specific gravity of from 0.96 to 1.05, being soluble in natural drying oils, carbon tetrachloride, benzene, butyl alcohol, acetone and 50 to 80% soluble in sulfuric acid, said elastomer compounding material being copolymerizable with linseed oil and highly reactive with dissolved sulfur at 300° F.

WILLIAM E. ELWELL.
NEAL W. FURBY.

REFERENCES CITED

The following references are of record in the file of this patent:

UNITED STATES PATENTS

| Number | Name | Date |
|---|---|---|
| 2,184,325 | Sweeney et al. | Dec. 26, 1939 |
| 2,253,323 | Christmann | Aug. 19, 1941 |
| 2,293,208 | Lazar et al. | Aug. 18, 1942 |
| 2,330,798 | Chitttick et al. | Oct. 5, 1943 |
| 2,354,554 | Showalter et al. | July 25, 1944 |
| 2,258,821 | Steininger et al. | Oct. 14, 1941 |
| 2,240,081 | Thomas | Apr. 29, 1941 |
| 2,217,919 | Rostler et al. (A) | Oct. 15, 1940 |
| 2,217,918 | Rostler et al. (B) | Oct. 15, 1940 |